Reissued Apr. 21, 1925.

Re. 16,047

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

SURFACING SPONGE RUBBER.

No Drawing. Original No. 1,501,009, dated July 8, 1924, Serial No. 608,752, filed December 23, 1922.
Application for reissue filed October 14, 1924. Serial No. 743,638.

*To all whom it may concern:*

Be it known that I, THOMAS W. MILLER, a citizen of the United States, residing at Ashland, in the county of Ashland and State of Ohio, have invented certain new and useful Improvements in Surfacing Sponge Rubbers, of which the following is a full, clear, and exact description.

My invention relates to surfacing sponge rubber and the principal object of my invention is to provide new and improved sponge rubber products and new and improved means of making such products. In this application I have described, for purposes of illustration, one such product and one such method, and I have chosen for that product a sponge rubber tennis ball provided with a felted covering, and for that method a method particularly suited to the manufacture of the selected product.

In carrying out the herein described embodiment of my invention I form a sponge rubber ball in any suitable manner and then dip this ball in a rubber cement into which has been incorporated a considerable amount of wool floc. Then, before this rubber cement has entirely dried, I place the ball in a receptacle containing a considerable amount of loose wool floc and rotate the receptacle until floc has become attached to the entire surface of the ball. I then replace the ball in a vulcanizing mold of the same size as the mold in which it was originally formed and heat the ball until the rubber cement has become thoroughly vulcanized and with the floc firmly embedded into the cement because of the pressure resulting from the use of a mold slightly smaller than the covered ball. In this manner I produce a sponge rubber ball which I may form of exactly the size and weight proper for a tennis ball, which is covered with a smooth, firmly affixed durable felted covering, and which is completely satisfactory as a substitute for the tennis balls now in use, will wear far longer, will not deteriorate during non-use, and may be manufactured at considerably less cost.

It will be obvious to those skilled in the art that my invention is applicable to sponge rubber balls other than the solid ball herein described, and to various articles other than balls; that the process described may be variously changed and modified, both for the formation of the specific article herein described and for the formation of other articles, and particularly by the omission of the floc from the rubber cement, the use of floc other than wool floc, the use of covering material other than any kind of floc, the application of the covering to only a portion of the surface of the article, the substitution of other means for securing the covering material to the sponge rubber, and the omission of simultaneous compression and vulcanization; and that all of these changes and modifications may be made without departing from the spirit of my invention or sacrificing the advantages thereof. It will therefore be understood that the disclosure herein is illustrative only and that my invention is not limited thereto.

I claim:

1. A tennis ball, comprising a body formed of sponge rubber, and a coating of loose wool floc applied and compacted thereon by vulcanization.

2. The method of manufacturing sponge rubber tennis balls and the like, which consists first in forming by vulcanization a sponge rubber ball of the desired size and weight, then dipping the same in a rubber cement containing a percentage of floc, then applying to the surface of said ball before it dries a coating of loose wool floc, and finally vulcanizing said cement coating under slight compression.

3. The method of vulcanizing sponge rubber tennis balls and the like, which consists first in forming by vulcanization a sponge rubber ball of the desired size and weight, then dipping the same in a rubber cement containing a percentage of floc, then before the cement dries tumbling said ball in loose wool floc, and finally vulcanizing said cement coating under slight compression.

4. The process of manufacturing rubber balls which comprises forming a ball having a sponge rubber surface portion, applying to the surface of said portion a coating consisting of rubber cement and floc, applying floc to said coating, and by vulcanization uniting all said floc to said ball and into a covering for said surface.

5. The process of manufacturing which comprises forming a body having a sponge rubber surface portion, applying to the surface of said portion a coating consisting of rubber cement and particles of material, applying further particles of material to said coating, and by vulcanization uniting all said particles to said body and into a covering for said surface.

6. The process of manufacturing which comprises forming a body having a sponge rubber surface portion, applying to the surface of said portion a coating consisting of rubber cement and floc, applying further floc to said coating, and by vulcanization uniting all said floc to said body and into a covering for said surface.

7. The process of manufacturing rubber balls which comprises forming a ball having a sponge rubber surface portion, applying to the surface of said portion a coating consisting of rubber cement and particles of material, applying further particles of material to said coating, and by vulcanization uniting all said particles to said ball and into a covering for said surface.

8. An article of manufacture having a rubber surface portion surmounted by a coating of rubber vulcanized integral and substantially coelastic with said portion and having fibrous material vulcanized in said coating with at least part of said fibrous material extending exteriorly of said coating to form a covering for said coating, and with at least part of said fibrous material extending and vulcanized to said portion.

9. A ball having at least its face formed of rubber, and surmounted by a coating of rubber vulcanized integral and substantially coelastic with said face and having fibrous material vulcanized in said coating with at least part of said fibrous material extending exteriorly of said coating to form a covering for said ball, and with at least part of said fibrous material extending and vulcanized to said face.

10. An article of manufacture having a sponge rubber surface portion surmounted by a coating of rubber vulcanized integral and substantially coelastic with said portion and having fibrous material vulcanized in said coating with at least part of said fibrous material extending exteriorly of said coating to form a covering for said coating, and with at least part of said fibrous material extending and vulcanized to said portion.

11. An article of manufacture comprising a body formed of sponge rubber and having its surface surmounted by a coating of rubber vulcanized integral and substantially coelastic with said body and having fibrous material vulcanized in said coating with at least part of said fibrous material extending exteriorly of said coating to form a covering for said coating, and with at least part of said fibrous material extending and vulcanized to said body.

12. A ball having at least its face formed of sponge rubber, and surmounted by a coating of rubber vulcanized integral and substantially coelastic with said face and having fibrous material vulcanized in said coating with at least part of said fibrous material extending exteriorly of said coating to form a covering for said ball, and with at least part of said fibrous material extending and vulcanized to said face.

13. A ball comprising a body formed of sponge rubber and having its surface surmounted by a coating of rubber vulcanized integral and substantially coelastic with said body and having fibrous material vulcanized in said coating with at least part of said fibrous material extending exteriorly of said coating to form a covering for said ball, and with at least part of said fibrous material extending and vulcanized to said body.

14. A tennis ball having at least its face formed of rubber, and surmounted by a coating of rubber vulcanized integral and substantially coelastic with said face and having floc vulcanized in said coating with at least part of said floc extending exteriorly of said coating to form a covering for said coating, and with at least part of said floc extending and vulcanized to said portion.

15. An article of manufacture having a sponge rubber surface surmounted by a coating of rubber vulcanized integral and substantially coelastic with said portion and having floc vulcanized in said coating with at least part of said floc extending exteriorly of said coating to form a covering for said coating, and with at least part of said floc extending and vulcanized to said portion.

16. The process of manufacture which comprises forming a body having a rubber surface portion, applying to said portion a coating comprising rubber and particles of fibrous material embedded therein and extending therethroughout and present in sufficient quantity to both anchor said coating to said portion and also form a covering for said coating, and, by vulcanization, uniting at least some of said particles into a covering for said coating, and at least some of said particles to said portion.

17. The process of manufacture which comprises forming a body having a sponge rubber surface portion, applying to said portion a coating comprising rubber and particles of fibrous material embedded therein and extending therethroughout and present in sufficient quantity to both anchor said coating to said portion and also form a covering for said coating, and, by vulcanization, uniting at least some of said particles into a covering for said coating, and at least some of said particles to said portion.

18. The process of manufacture which comprises forming a body having a rubber surface portion, applying to said portion a coating comprising rubber in fluid form and particles of fibrous material embedded therein and extending therethroughout and present in sufficient quantity to both anchor said coating to said portion and also form a covering for said coating, and, by vulcanization, uniting at least some of said particles into a covering for said coating, and at least some of said particles to said portion.

19. The process of manufacture which comprises forming a body having a sponge rubber surface portion, applying to said portion a coating comprising rubber in fluid form and particles of fibrous material embedded therein and extending therethroughout and present in sufficient quantity to both anchor said coating to said portion and also form a covering for said coating, and, by vulcanization, uniting at least some of said particles into a covering for said coating, and at least some of said particles to said portion.

20. The process of manufacture which comprises forming a body, applying to a surface portion of said body a coating of rubber carrying the multiplicity of particles mixed therein, applying to said coating sufficient additional particles to form a covering for said coating, and, by vulcanization, uniting said coating to said body and said particles in said coating and into a covering for said coating.

21. The process of manufacture which comprises forming a rubber body, applying to a surface portion of said body a coating of rubber carrying a multiplicity of particles mixed therein, applying to said coating sufficient additional particles to form a covering for said coating, and, by vulcanization, uniting said coating to said body and said particles in said coating and into a covering for said coating.

22. The process of manufacture which comprises forming a sponge rubber body, applying to a surface portion of said body a coating of rubber carrying a multiplicity of particles mixed therein, applying to said coating sufficient additional particles to form a covering for said coating, and, by vulcanization, uniting said coating to said body and said particles in said coating and into a covering for said coating.

23. The process of manufacture which comprises forming a body, applying to a surface portion of said body a coating of fluid rubber carrying a multiplicity of particles mixed therein, applying to said coating sufficient additional particles to form a covering for said coating, and, by vulcanization, uniting said coating to said body and said particles in said coating and into a covering for said coating.

24. The process of manufacture which comprises forming a rubber body, applying to a surface portion of said body a coating of fluid rubber carrying a multiplicity of particles mixed therein, applying to said coating sufficient additional particles to form a covering for said coating, and, by vulcanization, uniting said coating to said body and said particles in said coating and into a covering for said coating.

25. The process of manufacture which comprises forming a sponge rubber body, applying to a surface portion of said body a coating of fluid rubber carrying a multiplicity of particles mixed therein, applying to said coating sufficient additional particles to form a covering for said coating, and, by vulcanization, uniting said coating to said body and said particles in said coating and into a covering for said coating.

In witness whereof, I hereunto affix my signature.

THOMAS W. MILLER.